United States Patent
Pham

(10) Patent No.: US 12,456,062 B2
(45) Date of Patent: Oct. 28, 2025

(54) HORTICULTURE GROWING SYSTEM WITH CONTROL SYSTEM WITH OPTIMIZED PARAMETERS DRIVEN BY CLOUD BASED MACHINE LEARNING

(71) Applicant: Link4 Corporation, Anaheim, CA (US)

(72) Inventor: Yen Lam Pham, Santa Ana, CA (US)

(73) Assignee: Link4 Corporation, Anaheim, CA (US)

( * ) Notice: Subject to any disclaimer, the term of this patent is extended or adjusted under 35 U.S.C. 154(b) by 987 days.

(21) Appl. No.: 17/526,876

(22) Filed: Nov. 15, 2021

(65) Prior Publication Data

US 2022/0156610 A1 May 19, 2022

Related U.S. Application Data

(60) Provisional application No. 63/114,953, filed on Nov. 17, 2020.

(51) Int. Cl.
*G06N 5/04* (2023.01)
(52) U.S. Cl.
CPC ...................... *G06N 5/04* (2013.01)
(58) Field of Classification Search
CPC ............ G06N 20/00; G06N 5/04; G06N 5/00; G06N 3/00; G06Q 10/04; G06Q 50/02
See application file for complete search history.

(56) References Cited

U.S. PATENT DOCUMENTS

| | | | |
|---|---|---|---|
| 7,617,057 B2 | 11/2009 | May et al. | |
| 8,321,365 B2 | 11/2012 | Anderson | |
| 9,076,105 B2 | 7/2015 | Anderson | |
| 10,231,304 B2 | 3/2019 | Fredricks et al. | |
| 10,241,097 B2 | 3/2019 | Miresmaili et al. | |
| 10,349,584 B2 | 7/2019 | Itzhaky et al. | |
| 10,778,777 B2 | 9/2020 | Sacchetti | |
| 2014/0288850 A1* | 9/2014 | Avigdor | G01G 19/414 702/19 |
| 2015/0000190 A1* | 1/2015 | Gibbons | A01G 31/02 47/79 |
| 2017/0286772 A1* | 10/2017 | Workman | H04L 67/55 |
| 2020/0184153 A1* | 6/2020 | Bongartz | A01G 9/249 |
| 2020/0229357 A1* | 7/2020 | Spiro | A01G 9/247 |
| 2020/0260653 A1 | 8/2020 | Douglas et al. | |

FOREIGN PATENT DOCUMENTS

KR 20140114089 A * 9/2014 ............. G06Q 50/02

* cited by examiner

*Primary Examiner* — Kidest Worku
(74) *Attorney, Agent, or Firm* — Larry K. Roberts

(57) ABSTRACT

A horticulture growing system where a growing regimen is prescribed to achieve desired growing results. The system has self-learning mechanisms where the prescribed growing regimens are continually optimized to achieve the desired results through machine learning and deep learning. The system uses both a cloud based dynamic system model for growing and a local grow model. Various techniques are utilized to improve data collection and labeling. The results (the system's ability to accurately create growing regimens which produce the desired grow objectives) are improved using the dynamic system model and the local grow model. The models are trained and adjusted using datasets from multiple growing operations to increase the efficacy of the self-learning mechanisms. This system may also include a mechanism for in-harvest re-optimization to improve grow results in real-time.

12 Claims, 12 Drawing Sheets

HORTICULTURE GROWING SYSTEM WITH CONTROL SYSTEM WITH OPTIMIZED PARAMETERS DRIVEN BY CLOUD BASED MACHINE LEARNING

CROSS-REFERENCE TO RELATED APPLICATION

This application claims the benefit of U.S. Provisional Application No. 63/114,953 filed Nov. 17, 2020, the entire contents of which are hereby incorporated by reference.

BACKGROUND

Aspects of this disclosure are generally related to horticulture and agriculture, and to use of machine learning and deep learning to optimize plant growth.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
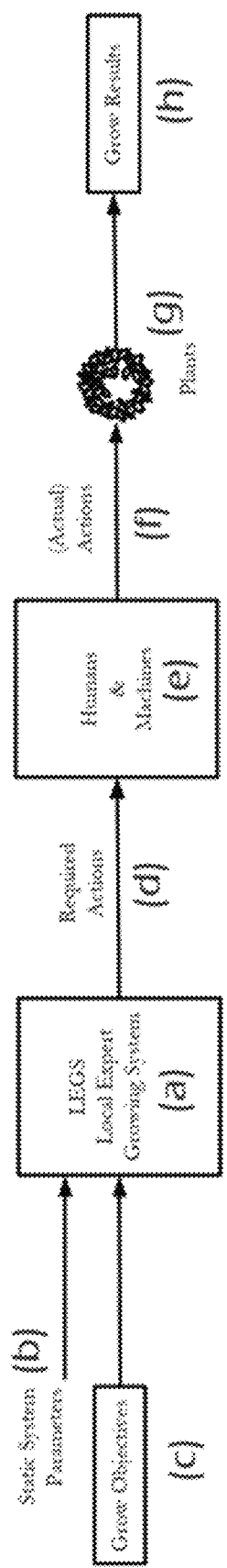
FIG. 1 is a schematic diagram illustrating an exemplary embodiment of a local growing system including a local expert growing system.

In the following detailed description and in the several figures of the drawing, like elements are identified with like reference numerals. The figures are not to scale, and relative feature sizes may be exaggerated for illustrative purposes.

An advanced horticulture growing system is described herein, where an optimal growing regimen is prescribed in order to achieve the desired growing results. The system has built-in self-learning mechanisms where the prescribed growing regimens are continually optimized to achieve the desired results through machine learning and deep learning. The system uses both a cloud based dynamic system model for growing and a local grow system model. Various techniques are utilized to improve data collection, self cleaning, and labeling. The results (the system's ability to accurately create growing regiments which produce the desired grow objectives) are optimized using a dynamic system model and a local system model. The models are trained and adjusted using datasets from multiple growing operations simultaneously to increase the efficacy of the self-learning mechanisms. This invention also has a mechanism for an in-harvest re-optimization loop to improve grow results in real-time.

By "self-cleaning" is meant a technique to make the data more readable and easily processed by the backend software. For example, notes and tags are used to set the proper context of the input data so the data can be classified more accurately. There is a side panel for note taking on input screens, and the left panel showing various sensors and gauges. This sets the proper context for the notes (they must be about THOSE sensors and THOSE gauges). The data is now effectively cleaner than without the proper context, so that it is typically unnecessary to go back in and clean the data manually by hand.

The context of the system (herein referred to as the Local Growing System, LGS) is a growing environment (FIG. 1) including the follow main elements. A Local Expert Growing System (LEGS) (a) is configured to accept an input vector describing the static parameters (b) of the system and a set of desired results called Grow Objectives (c). From the static parameters and the Grow Objectives, the LEGS system is configured to produce a set of time variant required actions (d). A set of humans or machines (e) receives the sets of required actions and performs the actual actions (f) to the plants (g). The actual actions (f) together with the environment (b) and plants (g) will over time produce a set of actual grow results (h).

The static parameters (b) are a set of static system parameters which completely describe the growing environment, including but not limited to such items as the organic and genetic information (e.g. plant breeds and varieties, nutrient makeups and availabilities), geographic details (longitude, latitude, average light, etc.), physical details about the growing space (e.g. A-frame greenhouse, square footage, shading systems, irrigation methods, etc.), personnel details (e.g. growing experience, demographics), and other similar types of data. The physical details may include environmental equipment which, for example, is used to control functions such as heating, cooling, lighting, $CO_2$, shading, irrigation, nutrient injection as a few representative examples.

Examples of grow objectives (c) are crop weight per square meters, plant color, skin thickness, chemical content, plant shape, etc.

Examples of required actions (d) are trimming and pruning regimens, irrigation and nutrient schedules, lighting, and heating and cooling schedules.

Figure 2:
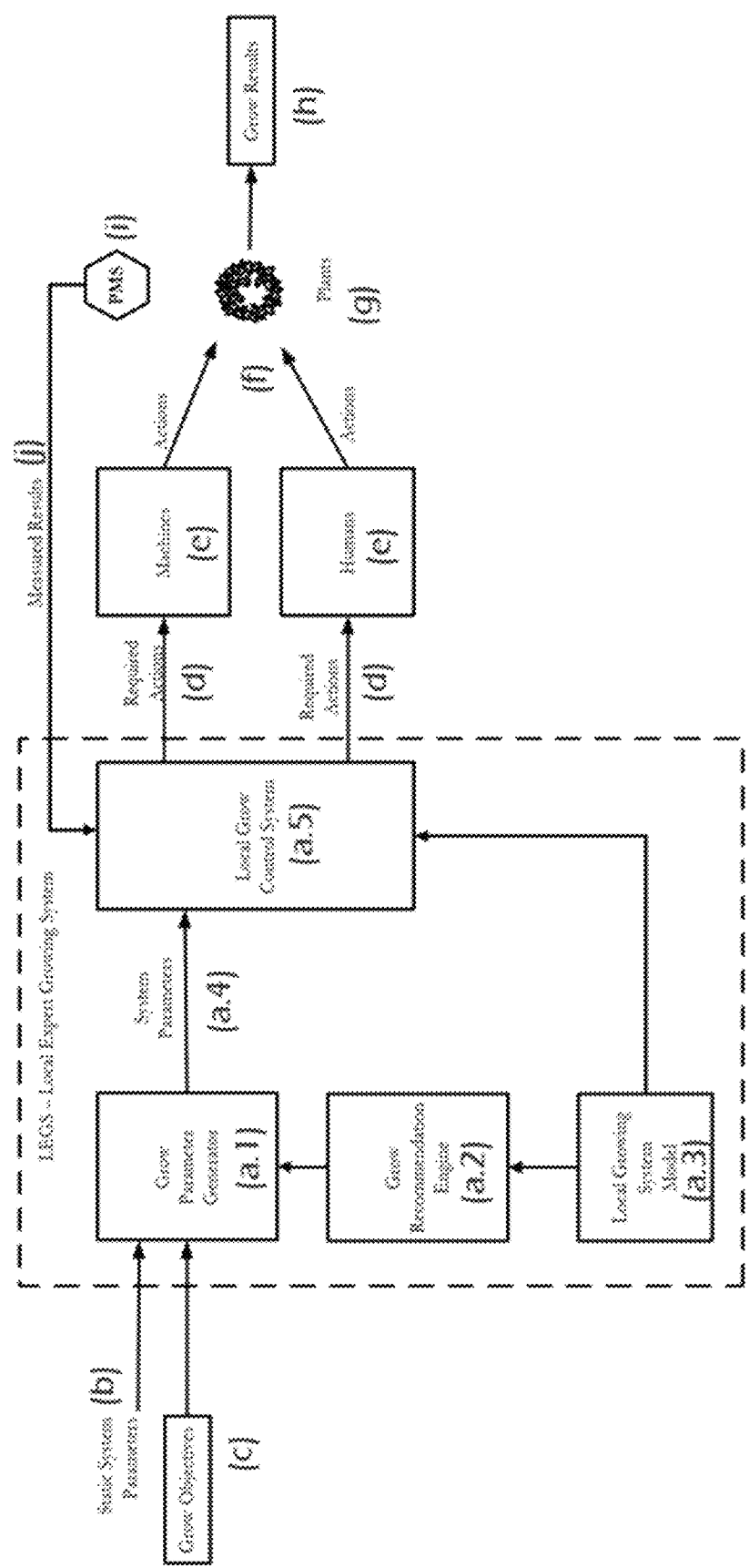
FIG. 2 is a schematic diagram illustrating the local growing system and local expert growing system in further detail.

Referring to FIG. 2, at the center of the Local Growing System is the LEGS (Local Expert Growing System) (a). This system includes four components: a Grow Parameter Generator (GPG) (a.1) wherein the Grow Objectives (c) are processed together with the given Static System Parameter (SSP) vectors (b), and the vector of System Parameters (a.4) is generated. Examples of System Parameters (a.4) are Average Day Temperature=75 F, particular trimming patterns, VPD=1.2, etc.

The Local Grow Control System (LGCS) (a.5) uses the System Parameters as targets and translates these targets into vectors of required actionable items (d) to be executed by the human and machine systems (e). For the GPG (a.1) and the LGCS (a.5) to operate properly, a model is provided of the entire system, i.e. the Local Growing System Model (LGSM) (a.3). The LGSM (a.3) is basically a large set of mathematical coefficients and transformation tables relating the SSP vector (b) and the Grower Objectives (GO) (c), resulting in a vector of Required Actions (RAs) (d) needed to best produce the Growth Results GR (h) that best match the Growth Objectives GO (c).

Figure 5:
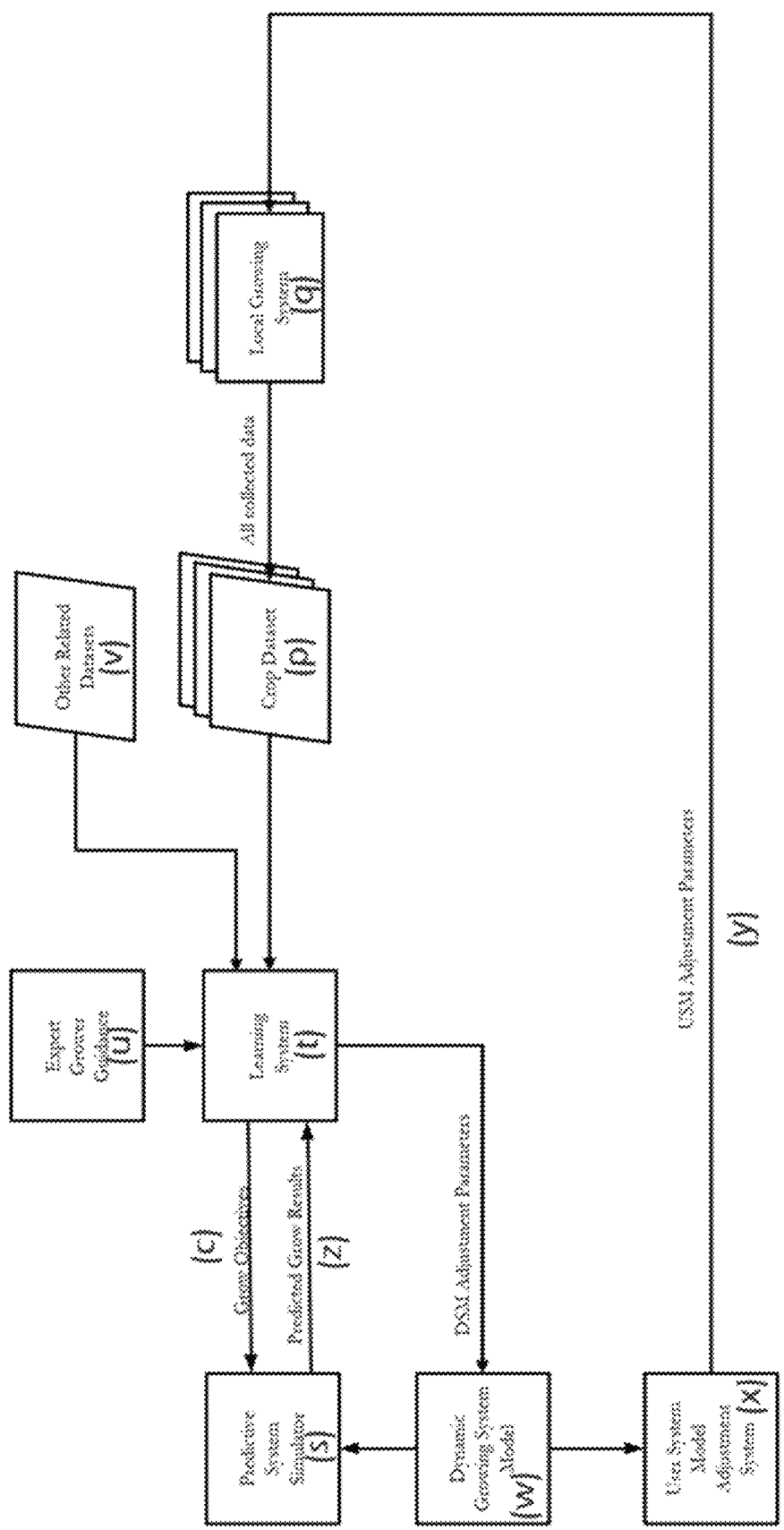
FIG. 5 is a schematic diagram illustrating an exemplary embodiment of a dynamic control system with optimized parameters driven by cloud-based machine learning.

In an exemplary embodiment, the LGSM (a.3) may be obtained from the dynamic growing system model (DGSM (w)), FIG. 5. It may be obtained, for example, by pulling out a subset of coefficients based on what is deemed to be the best fit, at the current time, for the local specific system as an initial condition. As the system proceeds in use, the system learns more and more about the local growing system as well as learning more about growing in general. Over time, the system will adjust the LGSM (a.3).

The LEGS also utilizes a local real-time control loop, utilizing a Plant Measurement System (PMS) (i), where various parameters (j) are measured, such as temperature, humidity, outside conditions, nutrient level, moisture, etc. The PMS (i) may include optical and infrared sensors as well as EC, pH, RFID and barcoding. The PMS (i) generally refers to a number of sensory systems. The local feedback control system utilizes the measured parameters (j) to adjust the required actions (d) and (f) to control and regulate the required system parameters (a.4). An example of this local control is a requirement of 3-day average temperature to be 75 F in the growing space. The PMS has detected that the temperature has been dropping steadily for past 2 days. The LGCS (a.5) will drive the third day temperature up to maintain a 3-day average temperature of 75 F.

In addition to the provided system model (LGSM) (a.3) of the grow (LGS), in practice, the actual growing personnel also typically have important inputs and adjustments that are taken into account by the LEGS (a) to improve the system results. This is accomplished in the Grow Recommendation Engine (GRE) (a.2) where system parameters and adjustments are presented to the local personnel for review, input, and guidance. The resulting user actions subsequently affect the generated parameters. An example of a recommendation might be whether or not a pesticide should be used. If the user (local personnel) declined the use of pesticide, then the resulting parameters (a.4) will be readjusted accordingly.

In an exemplary embodiment, the GRE (a.2) may have a variety to ways to present the recommendations to the users and to solicit user inputs. Some of these means are, but not limited to, messages delivered through pop-ups or in-system messages on the browser or the mobile app, text messages, emails, push notifications, a local HMI (human machine interface) display, etc. All recommendations are accompanied with several important elements: the suggestion, a solicitation for acceptance (which includes denial), and a rating mechanism for the quality of the recommendation itself.

Figure 3:
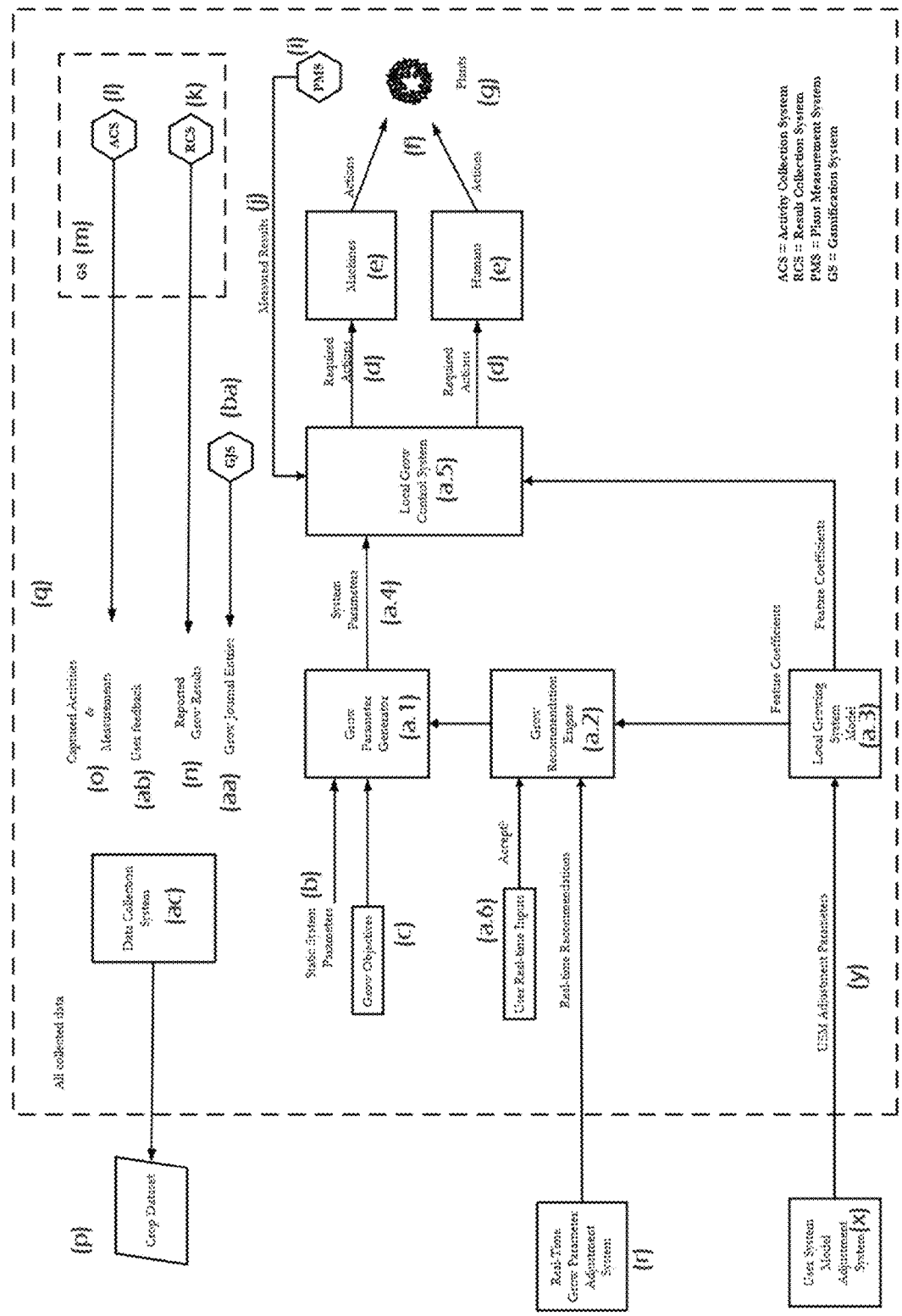
FIG. 3 is a detailed schematic diagram illustrating an exemplary embodiment of a local growing system.

FIG. 3 is a detailed schematic diagram illustrating the local growing system of FIG. 3 in further detail. In addition to the features shown in FIG. 2, the local growing system includes a Result Capturing System(s), RCS (k). Typically, the RCS (k) is not a single system but a number of possible systems. These systems are designed to capture the end results for the harvest so that the end results (Reported Grow Results) can compared to the original grow objectives. In practice, it is found that many local grow system users are inherently reluctant to provide the actual grow results, so some of the results are captured directly and some indirectly. Some of the simplest elements are a scale to weigh the harvest, or a lab result to report on the desirable quality of the fruit. Other elements are cameras and pictures of the crop. Through image processing some of the results of the harvest such as fruit size, color, appearance, etc. can be deduced. An example of the indirect element of the result capturing system is the post harvesting survey. The RCS will simply ask the users to rate the harvest amongst various important categories that can be related back to the original grow objectives (c) so that the success level of this harvest can be inferred.

Referring now to FIG. 3, to learn and improve on the results, all data is required to be captured, organized, and labeled properly. Often, this is the most critical aspect of a self-learning system. In addition to data holes or missing data, there are also inherent errors in system data. For example, the Grow Results (GR) (h) are often not known or captured thus making it impossible to classify the result of the harvest as successful or not successful against the original Grow Objectives (GO) (c). Even in the case where the GR are captured by the Result Capturing System, RCS (k), the data captured, Reported Grow Results (RGR) (n) are not exactly GR (h). The resulting errors must be taken into account in the learning algorithms.

In addition to objectives and actions, there are often many other activities and measurements (o) that may or may not contain important "features" (or signals) that are correlated to the desired GO (c) and GR (h). These activities are captured by the Activity Capturing System (ACS) (l). Some examples of ACS components are cameras, QR codes, button presses, RFIDs, etc. The ACS may encompass various ways to capture what is actually being done. At the core of it is a task tracking system tracking as many of the measurable activities and tasks as much as possible. The workers are asked to enter in tasks (pre-assigned or unassigned) into a form on the app on the phone, tablet, or browser. The basic information includes the details of the task being done, start and finish times, status, notes, etc. Information can be typed in or scanned in using barcodes or QR codes. Activities can also be tracked automatically without any user interventions. Cameras can be used to record activities in a specific work cell, e.g. trimming area, to infer specific tasks. Similar results can be acquired by tracking tool usages for a particular task. Examples of track activities are just plain movements around and between the plants, pruning, checking pesticide traps, hand watering, etc.

A significant challenge is how to motivate the users to capture, or allow for the capturing of, the data for the system in the first place. Even when the data is captured, there is a challenge to get the users to label the data correctly. Examples of such data labels include successful harvest, mold breakout, mildew problem, great application of growth regulators, etc. In accordance with aspects of this invention, significant steps to address and solve this challenge include utilizing a Gamification System (GS) (m) (FIG. 3). Various techniques are used by the GS (benchmarking, ranking, badges, icons, etc.) to encourage data capturing and labeling. Likes and dislikes or up/down votes are used to get the system to "self-label" the data. In an exemplary embodiment, the GS is implemented by a GS algorithm running on either a local computer system or a cloud-based server.

The Gamification System in an exemplary embodiment may benchmark the user's activities against other high-performance operations which should motivate them to record more data if needed. For example, a metric for a good operation is 5.2 observations are recorded per grow room per day. If the user's current is at 2.2 observations, the system will alert the user to the variance and encourage him to record more entries. Another usage example for the Gamification System (GS) is its ranking badge system where there are points assigned to various activities (a regular system note is 1 point, but a note with a picture attached is 5 points, etc.) Congratulatory announcements are broadcasted to all users when various individuals have been promoted or the ranking has been changed. The GS is designed to adapt its behaviors to keep the users motivated to record the data it needs to improve the system models.

Still referring to FIG. 3, another method to get the users' assistance to label the data is with the design of a Grow Journal System (GJS) (ba). The users are encouraged to keep careful records of the data of the grow cycle in a natural language format. Using existing NLP (Natural Language Processing) technologies, these notes may be used to label the data with the appropriate features with an appropriate strength function.

Figure 4:
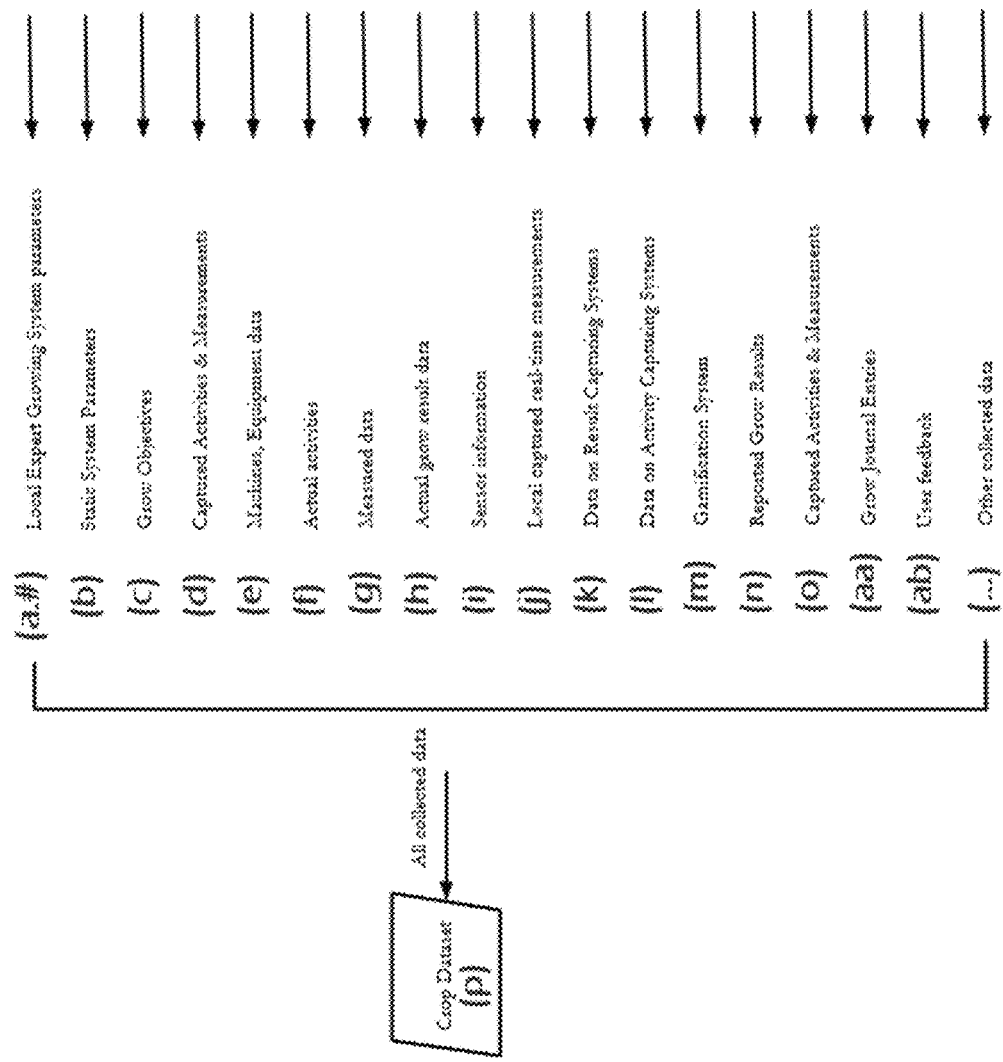
FIG. 4 depicts exemplary data sources for a crop dataset.

At the end of a harvest, all data, e.g. (a.#), (b), (c), (d), (e), (f), (g), (h), (i), (j), (k), (l), (m), (n), (o), (aa) . . . , are collected and compiled into an object (p), as shown in FIG. 4. From this Crop Dataset, a tensor (p) is compiled and stored for analysis and learning.

Referring now to FIG. 5, an exemplary embodiment of a dynamic growing system driven by cloud-based machine learning, where data is continually collected, stored, and analyzed. The system is configured to receive via the Internet data from at least one, and preferably several or many, local growing systems (q) and their respective crop datasets (p), as well as other related datasets (v) and expert grower guidance (u). These datasets, tensors, contain labeled data with original objectives (GO) (c), and their corresponding results (GR) (h), along with a set of associated data, that has a combination of related features and noise. The ultimate purpose of these collected data tensors (p) is to train and retrain (deactivating the noise, data with no usable features) the dynamic growing system model (w). The respective user is then able to adapt his own local growing system model (a.3) from the system model (w) to generate a set of actions (d) where the grow results (GR), (h) best match the original grow objectives (GO) (c).

The system of FIG. 5 has an existing Dynamic Growing System Model, DGSM (w). This is typically created with the guidance of Expert Growers (u), using existing horticulture knowledge. With this model, one can create a predictive system simulator, PSS (s), which makes predictions and suggests anticipated Predicted Grow Results, PGR (z) given the desired objectives, GO (c), and system parameters, SSPs (b). An exemplary embodiment of the PSS is basically a matrix mathematical formulation that is coded. The linear aspects of the PSS are:

$PGR_i = f(SSP_i, GO_i)$

Where i is the instance of the system of interest, and $f( )$ is a function using the coefficients from the Dynamic Growing System Model (w). The coefficients are stored in a large matrix relating each element of SSP, and GO, to a resulting element of $PGR_i$. For example, $$PGR_{m,i} = \sum_{j=1}^{k} (\alpha_{j,i} \cdot SSP_{j,i}) + \sum_{x=1}^{y} (\beta_{x,i} \cdot GO_{x,i})$$

where
i is the $i^{th}$ instance of the instance of the system in interest
m is the $m^{th}$ element of the Predicted Grow Results vector (PGR)
k is the number of Static System Parameters for system i
$\alpha_i$ is the coefficient for $SSP_i$ related to $PGR_{m,i}$
y is the number of Grow Objectives (GO) for system i
$\beta_i$ is the coefficient for GO, related to $PGR_{m,i}$ It should be noted that the above is the linear version of the PSS. There are many non-linear relationships as well. They are coded uniquely as patterns reveal themselves either by the learning system (t) or by the horticulture experts (u).

The PSS (s) may have varying successes with its predicted results (PGR) (z) to the reported grow results (RGR) (n). A Learning System (LS) (t) is configured to use these varying success probabilities to optimize the DGSM (w) by iterative search methods, such as linear search methods. One exemplary example of a linear search is as follows. Here is an example of a linear search. Referencing the above equations, the DGW (w) is represented by 2 vectors $\vec{\alpha}$ and $\vec{\beta}$, and both are used to produce a $PGR_i$. Since the true, actual result for this dataset i is already known—Reported Grow Results (RGR) (n), a success score can be obtained for this set of vectors. Now, an element in one or both of these vectors is incremented, and the incremented vector is fed back into the PSS to obtain a new $PGR_i$ which will have either an improved or degraded success score as compared to the previous iteration(s). This process is repeated many times by the LS to locate an optimal set of vectors for the DGSM.

The DGSM (w) has defined features (e.g. average temperature, locations, plant genetics, nutrients, irrigation, etc.) which are guided by the expert growers (u). Simple machine learning techniques, such as the linear search techniques described in the previous paragraph are used to generate the optimal set of parameters for the DGSM (w). The process managed by the Learning System (t) continually feeds crop datasets (p) into the system and improved coefficients are generated and adjusted on an as needed basis.

However, it should be noted, that within the horticultural context, each dataset (p) requires a lengthy timeframe to collect. Each Local Growing System (q) is only capable of generating a small number of datasets during a year. In accordance with an aspect of this invention, the system of FIG. 5 is configured to connect to a large number of LGS (q) to increase the number of collected datasets (p). The Learning System (t) is configured to discern and label the datasets (p) correctly as to not misattribute the data and their results. For example, datasets for leafy greens are not the same as for hydroponic tomatoes.

Still referring to FIG. 5, once the DGSM (w) has been approved by the Learning System (t), the local model (a.3) is adjusted accordingly. The Learning System has to check to make sure that the Local Grow System Model matches the Dynamic Grow System Model and will benefit or improve with a new adjustment. For example, assuming that the DGSM's performance for lettuce crop has been enhanced, then if the Local System Model is being used to grow lettuce, it will be approved to receive new adjustments. The new adjustments are accomplished by the User System Model Adjustment System (x) (FIG. 3). The adjustments (y) are sent to the local growing system (q) to have its model (a.3) adjusted. For example, the Dynamic Growing System Model (w) has the coefficients for various varieties of tomatoes. However, the local growing system (q) is growing Celano tomatoes (g). If there are improvements for the Celano tomatoes model, only then would the adjustment system (x) make adjustments (y) to the local model (a.3).

Figure 6:
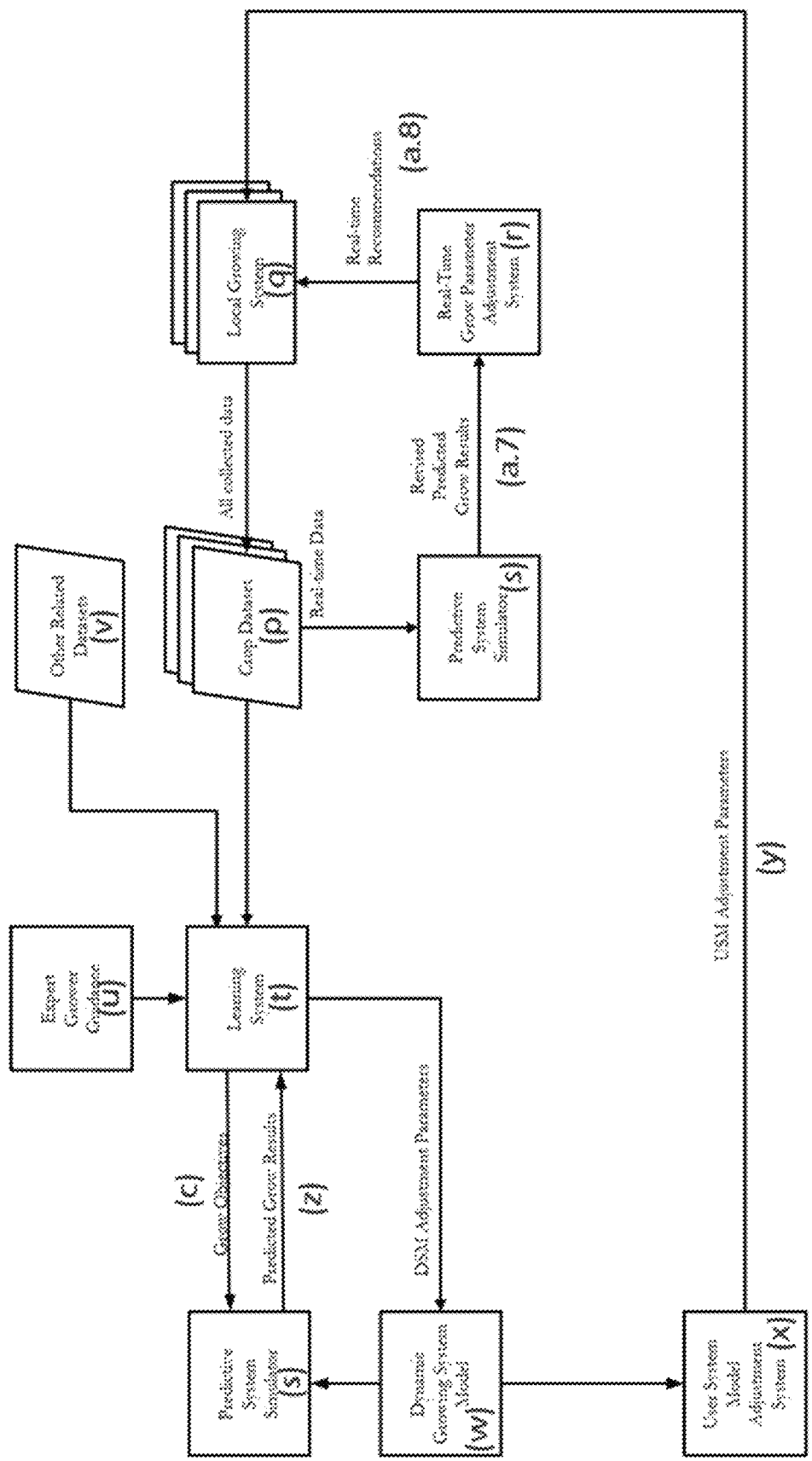
FIG. 6 is a schematic diagram illustrating an exemplary embodiment of a dynamic control system with optimized parameters driven by cloud-based machine learning with in-harvest re-optimization.

Another method to improve the predicted results (PGR, z) (FIG. 6) is to use deep learning algorithms to find hidden features in the data. The crop datasets (p) and any related datasets (v) (e.g. disease models from USDA) can be used to find these features. The datasets can be repeatedly back fed into the model (w) to surface new features. For example, in the foregoing equation for PGR, there is only one layer between the inputs (SSP and GO) and the outputs (PGR). One can insert one or more layers in between the inputs and the outputs, called hidden layers, to yield more predictive and accurate results (PGR). There are known ways to form these layers and create various activating functions to group or weigh the transfer functions between the output of one layer to the input of the next. Then iteratively the weight of each node (sometimes called neurons) in the layer can be varied to search for a model that yield maximal results. A couple of examples of good algorithms is the Multilayer Perceptrons (MLPs), where there multiple hidden layers with activating functions to determine which combinations (nodes, neurons, etc.) are successful and should be used; and, where there are spatial data (e.g. plant images or temperature gradient in a room), the KNN (k-Nearest Neighbor) or RBFN (Radial Basis Function Networks) could be used, where the spatial distance between the data is used in the activating function of the nodes.

In horticulture, a single dataset typically takes weeks and months to collect. To train a system so that the DGSM (w) or LGSM (a.3) models have the necessary amount of data and are usable may take many years. Even with the prescribed approach of simultaneously collecting data from multiple similar growing systems and reoptimizing the models may still take an inordinate amount of time for the models to be improved (the learning process). During this learning process, the local growing system (LGS) (q) has a significant probability that its grow results (GR) (h) will diverge significantly from the original desired results (GO).

Figure 6A:
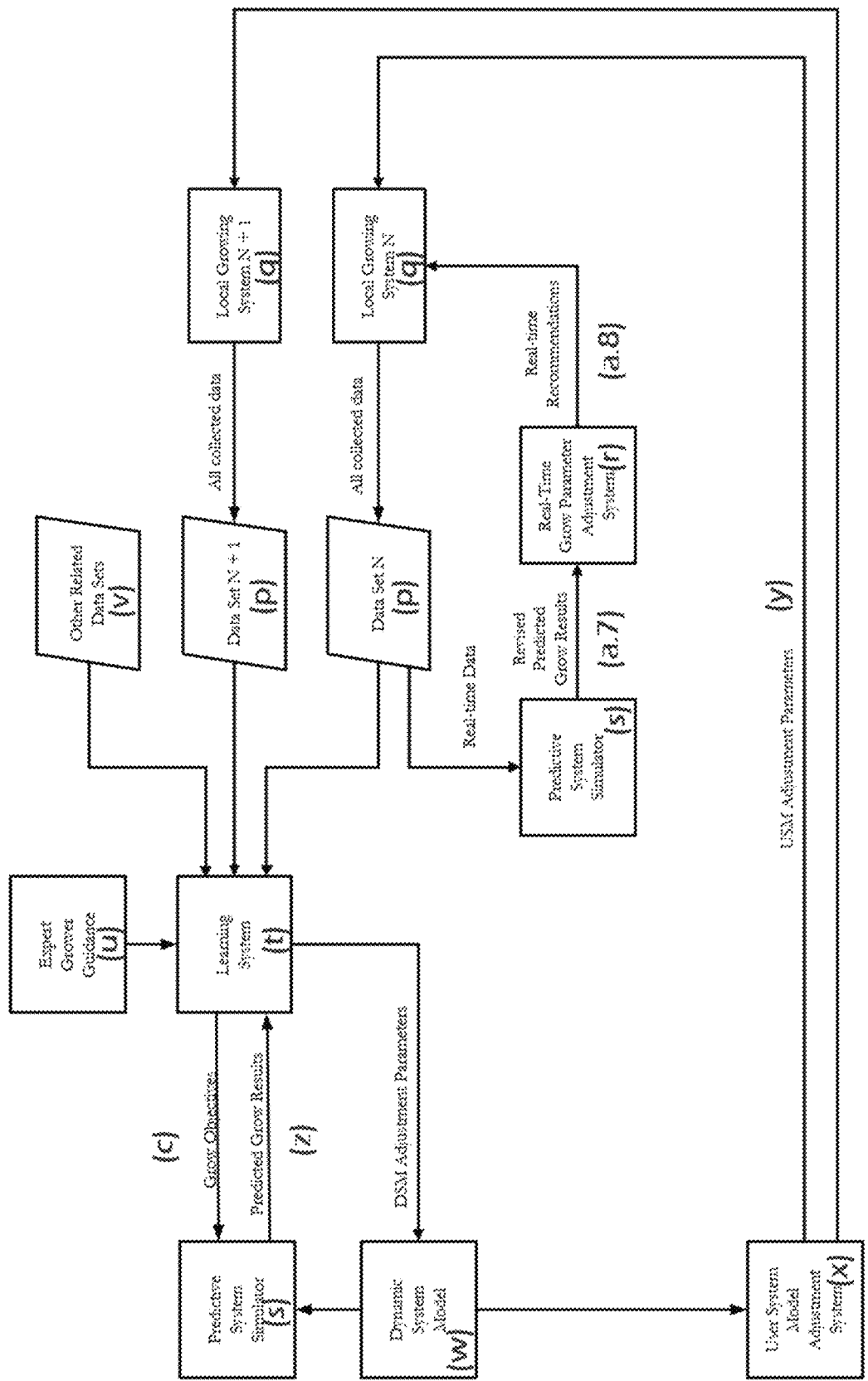
FIG. 6A is a schematic diagram similar to FIG. 6 but showing N, N+1 local grow systems explicitly.
Figure 7:
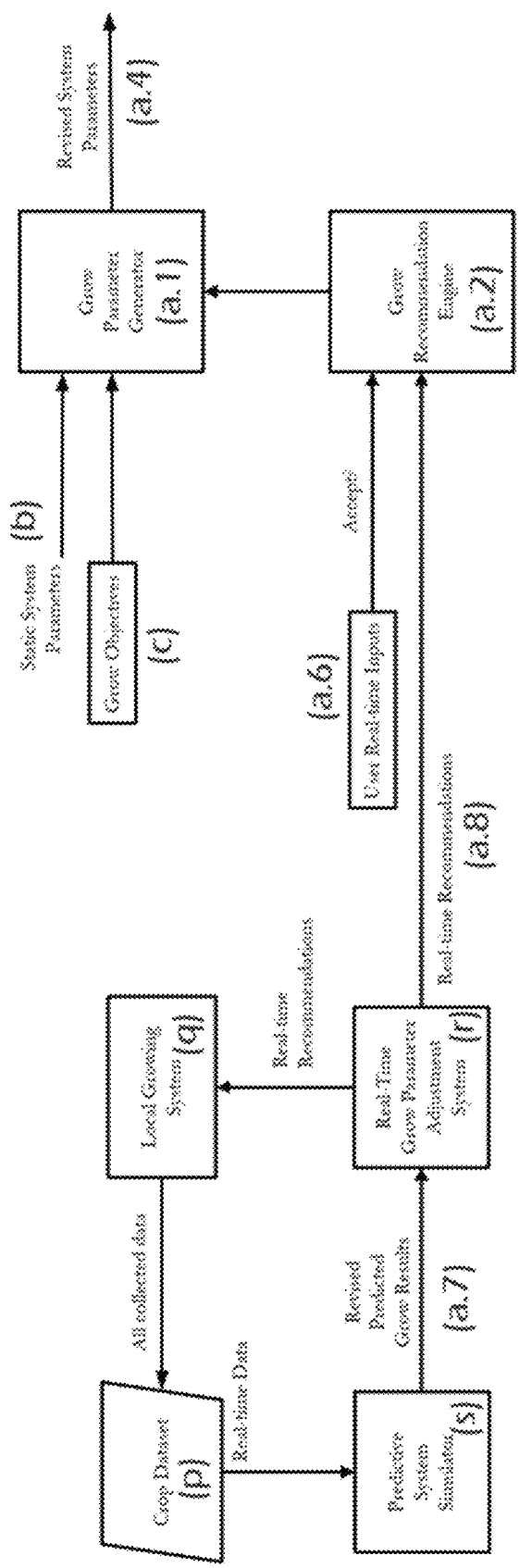
FIG. 7 is a schematic diagram illustrating an exemplary embodiment of a real-time in-harvest optimization process.

Referring now to FIGS. 6A and 7, in accordance with an aspect of the invention, to compensate for this divergence, a partially formed crop dataset (CS) (p) is formed and fed it into the PSS (s) to get new Revised Predicted Grow Results (RPGR) (a.7). A Real-Time Grow Parameter Adjustment System (r) evaluates the newly predicted results (RPGR) against the original grow objectives (GO) (c) to form a corrective set of actions. These actions are presented as Real-Time Recommendations (RTR) (a.8) to the GRE (a.2). With users' approval (a.6), a new set of system parameters (a.4) can be generated and a new course of action taken.

It should be noted that, at this point, the crop dataset (p), which includes the adjusted course of action, previously adjusted by the system model (w), will then be used to refine the dynamic system model (w) upon completion of the grow. There is a recursive effect within the dataset which is noted and taken into account by the Learning System (t).

Figure 6B:
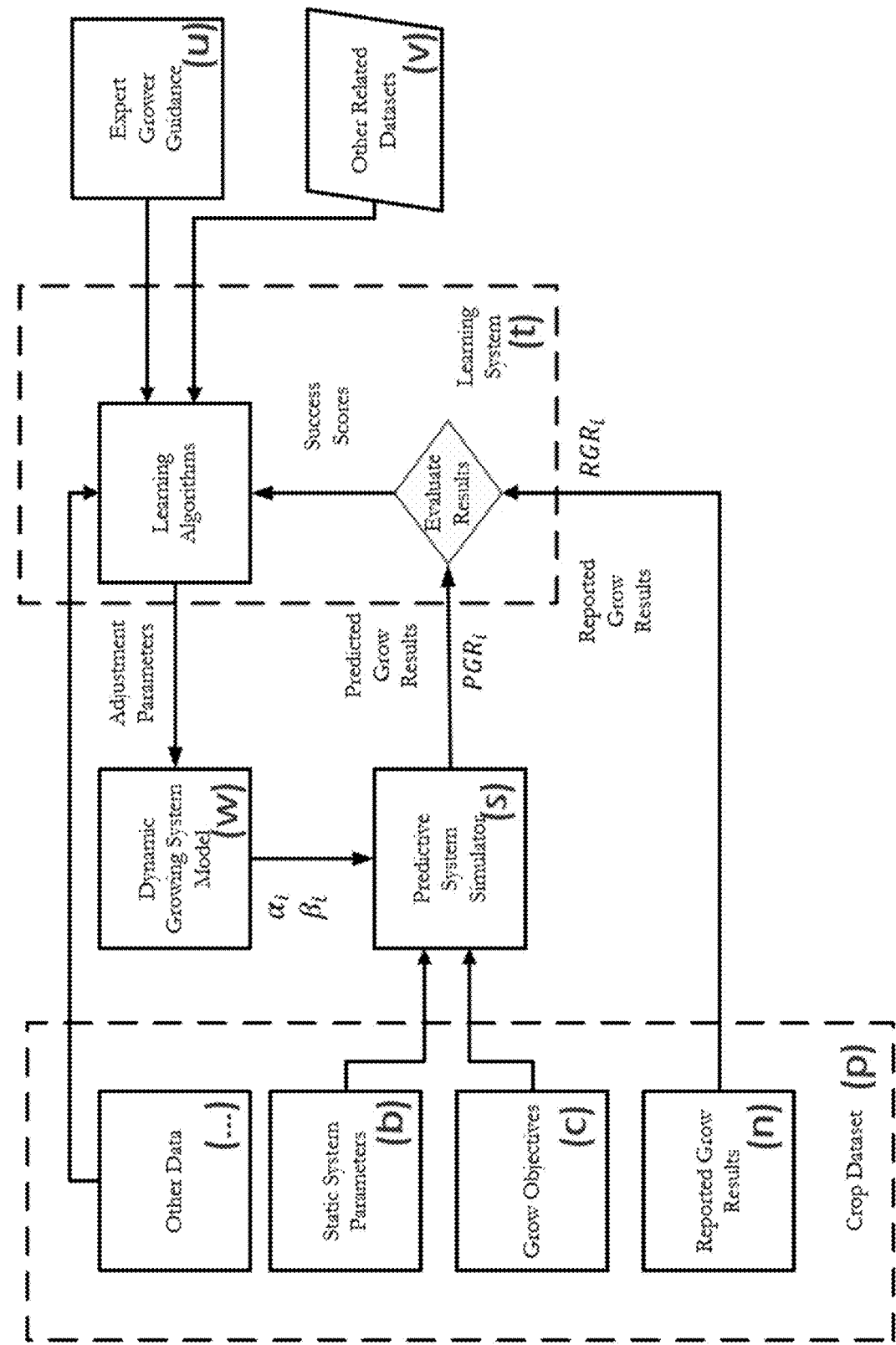
FIG. 6B is a schematic diagram illustrating an exemplary operation of the learning system.

FIG. 6B illustrates an exemplary learning system (t) operation. As noted, the learning system includes learning algorithms which processes the crop data set(s) (p) and other related datasets (v), and utilizes expert grower guidance (u). The learning algorithms generate adjustment parameters to the dynamic growing system model (w). The adjusted model coefficients are processed by the predictive system simulator (s) to provide predicted grow results to the learning system (t). The predicted grow results are evaluated by the learning system and success scores are fed back to the learning algorithms.

Another way for the Learning System (t) to train and improve the model (w) is to segment the data and focus on the user's real-time manual inputs (a.6). With labeled data (grow journal entries) and other related data around these events (a.6), using machine learning techniques, such as a decision tree technique, the system model (w) and local model (a.3) can be trained using a much smaller set of data. While a whole harvest dataset (p) can take weeks or months to collect, user inputs (a.6) can be learned using datasets with lengths of just hours or a few days.

Figure 8:
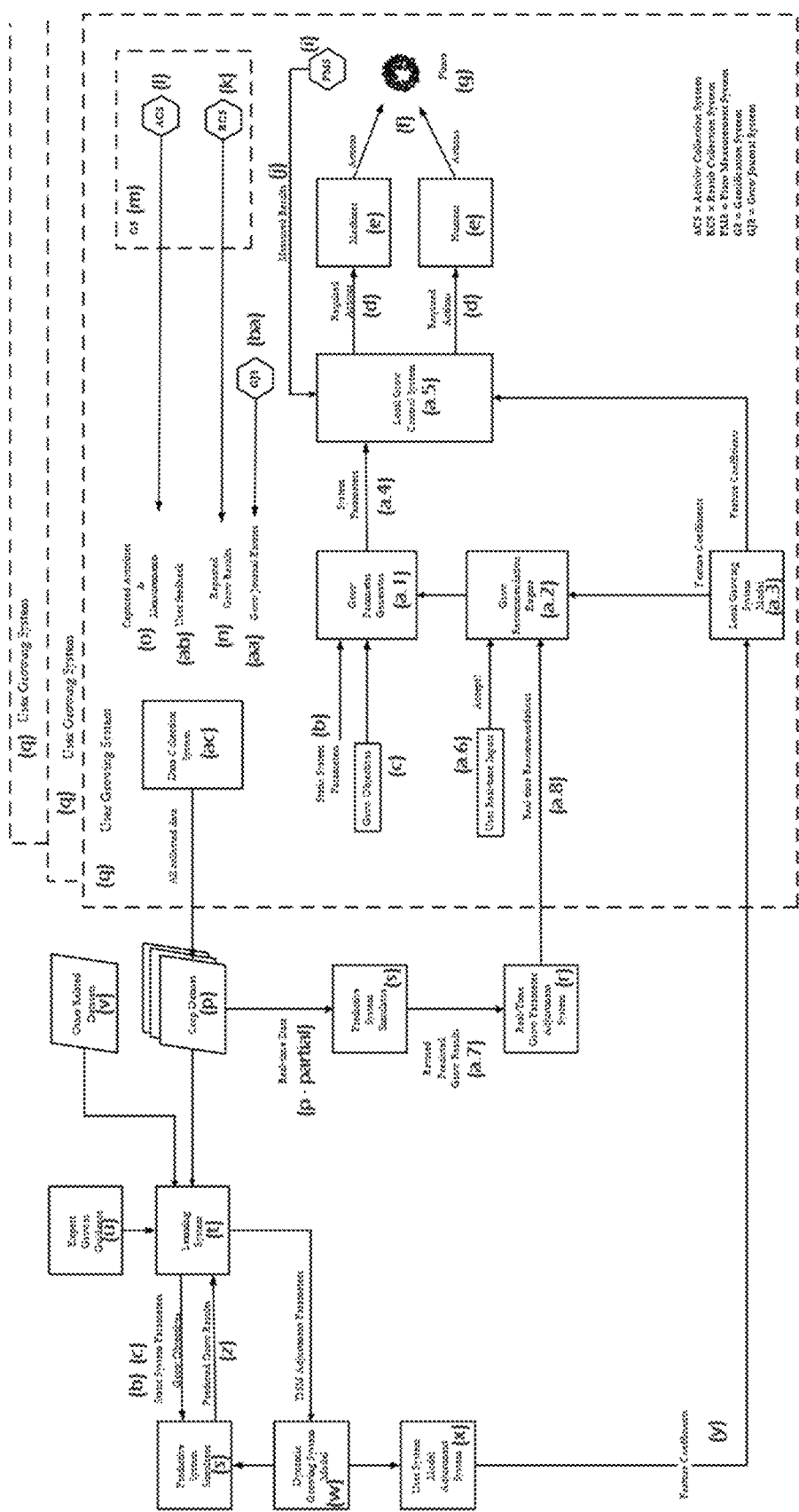
FIG. 8 is a simplified schematic diagram of one exemplary system architecture.

FIG. 8 illustrates one exemplary system architecture for the growing system. Each user or local growing system (q) generates a respective crop dataset (p), and each dataset (p) is sent to a cloud-based server which stores and analyzes the datasets. The learning system (t) processes the respective datasets (p) in conjunction with expert user guidance (u) and other related datasets (v), with the predicted grow results (z) from the predictive system simulator (s) as previously described. The dynamic growing system model (w) is updated with the adjustment parameters from the learning system (t). The user system model adjustment system (x) analyzes the adjusted system model (w) and provides adjustment feature coefficients to the local growing system model (a.3) of the respective user growing system (q).

Figure 8A:
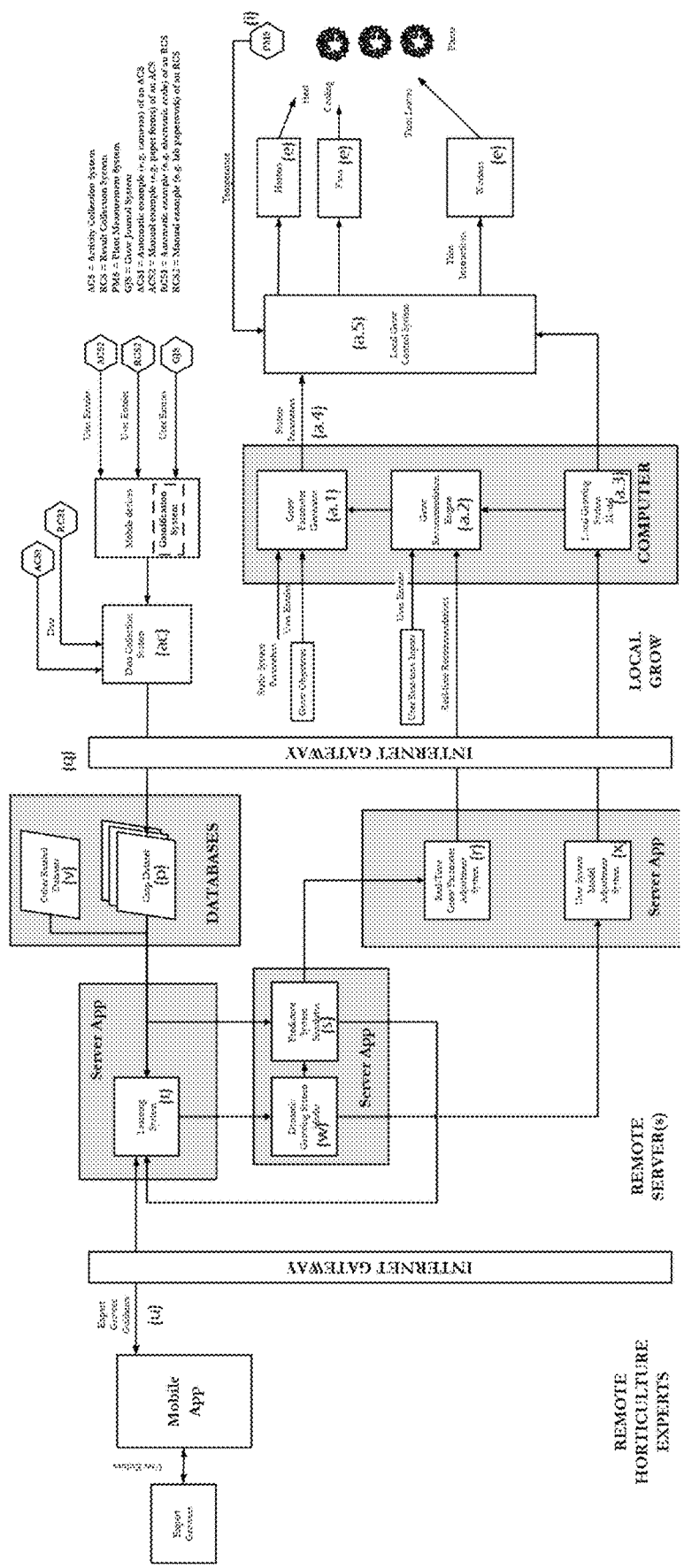
FIG. 8A is a simplified schematic diagram of another exemplary system architecture.

FIG. 8A is a schematic illustration of one exemplary implementation of the system shown in FIG. 8. At the local growing system (q), a computer is connected to the Internet via an Internet gateway. The computer includes a processor and nonvolatile memory and is configured to run the local growing system application software. The software implements the grow parameter generator (a.1), the grow recommendation engine (a.2), and maintains the local growing system model (a.3). The data collection system (ac) may be implemented as a stand-alone system, or controlled/implemented by the application software. User entries may be provided by mobile devices to provide inputs to the data collection system. The user inputs can include, for example, inputs from a plant measurement system (PMS), the grow journal system (GJS), cameras (ACS1), paper forms (ACS2), electronic scales (RCS1) and lab paperwork (RCS2). The gamification system is implemented to encourage user input collection. The local grow control system (a.5) in this embodiment receives system parameter data from the grow parameter generator, as well as the local growing system model (a.3). The local grow control system is typically an electronic system, including a processor, and includes control devices such as relays, switches and the like to control environmental devices such as, by way of example, heaters and fans in accordance with the system parameters. The local grow control system may also provide instructions to the local grow system workers to carry out manual tasks, such as trimming. The instructions may be conveyed to the workers by text, displayed messages, printed instructions or other conventional techniques.

Still referring to FIG. 8A, one or more remote servers connected to the Internet cloud includes server application software for the learning system (t), the predictive system simulator (s) and dynamic growing system model (w), and the real time grower predictive adjustment system (r) and user system model adjustment system (x). The server also includes databases (memory) storing the crop dataset (p) and other related datasets (v). Expert growers may also connect to the remote server(s) via a mobile app and the Internet to provide expert grower guidance to the learning system (t).

Figure 8B:
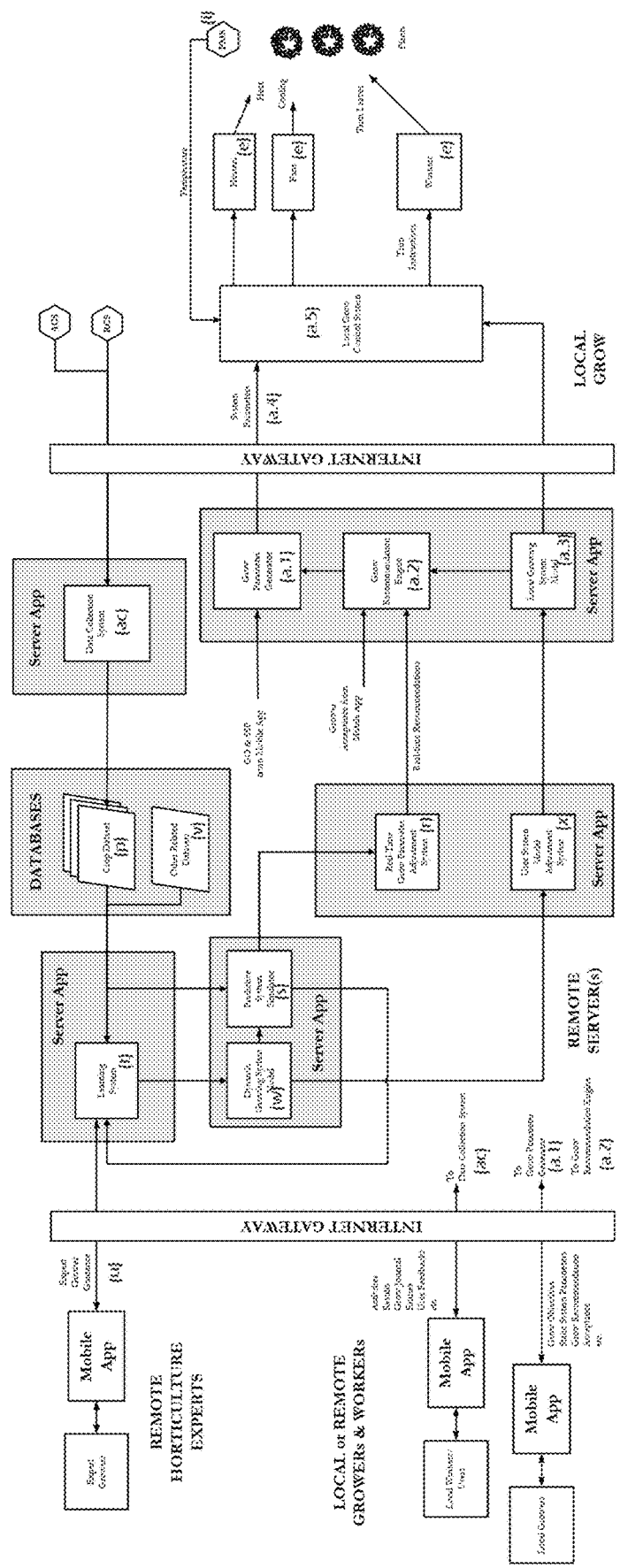
FIG. 8B is a simplified schematic diagram illustrating a further exemplary system architecture.

FIG. 8B illustrates another embodiment of a system architecture. The cloud-based remote server(s) are configured to run several applications to implement the learning system (t), the dynamic growing system model (w), the predictive system simulator (s), the real-time grow parameter adjustment system (r), the user system model adjustment system (x). The remote server(s) further store and maintain the crop datasets (p) and other related databases (v). In this exemplary system architecture, instead of residing at the local grow system (q), the cloud-based remote server(s) includes application software configured to implement the grow parameter generator (a.1), the grow recommendation engine (a.2), the local growing system model (a.3) and the data collection system (ac).

Still referring to FIG. 8B, at the local growing system(s) (q), the local grow control system (a.5) receives the system parameters (a.4) and the feature coefficients from the respective grow parameter generator (a.1) and local growing system model (a.3) on the remote server(s) via the Internet gateway. Data from the local activity capturing system (ACS) and the local results capturing system (RCS) are uploaded via the Internet gateway to the cloud-based data collection system (ac).

FIG. 8B further illustrates mobile apps that allow the local workers to interact remotely with the data collection system (ac), and the local growers to interact with the grow parameter generator (al) and the grow recommendation engine (a.2) with regard to grow objectives, static system parameters, grow recommendation acceptance, by way of example. Also shown is a mobile app allowing the expert growers to interact with the learning system (t).

Although the foregoing has been a description and illustration of specific embodiments of the subject matter, various modifications and changes thereto can be made by persons skilled in the art without departing from the scope and spirit of the invention.

What is claimed is:

1. A horticulture control system for control of a local expert growing system to grow plants in a local growing environment, the horticulture control system comprising:
   a set of grow objectives for the local growing system comprising one or more of crop weight per square meter, plant color, skin thickness, chemical content and plant shape;
   a set of static system parameters defining aspects of the local growing environment, including to plant breeds and varieties, geographic location (longitude and latitude), physical details of the growing system environment including area and irrigation methods and environmental equipment including one or more of heating, cooling, irrigation and lighting equipment;
   a local growing system model (LGSM) of the local growing system including a set of feature coefficients and tables, the LGSM relating the set of static system features and set of grow objectives to provide a set of required actions to produce grow results that best match the set of grow objectives;
   a grow recommendation engine (GRE) responsive to the set of feature coefficients, user real-time inputs and externally supplied real-time recommendations to provide selective adjustments to a set or vector of dynamic system parameters;
   a grow parameter generator configured to generate said set or vector of dynamic system parameters in response to outputs from the GRE, the LGSM and said set of static system parameters;
   an electronic local controller configured to produce a set of actionable instructions for the local growing system based on said dynamic system parameters and said LGSM;
   a physical system including one or more of heating, cooling, irrigation and lighting equipment to perform the actionable instructions on the local growing system;
   a measurement system configured to collect result data from the physical system, including data from the plants and local environment;
   a cloud-based mathematical dynamic system model of a growing system comprising a set of coefficients;
   a cloud-based system responsive to collected result data from the local growing system and other local growing systems to assess of the local growing system against the set of grow objectives, the cloud-based system including a cloud-based machine learning system including an algorithm to train and retrain the dynamic system model to iteratively adjust the dynamic system model in dependence on the collected result data from the local growing system and said other local growing systems, wherein data is continuously collected, stored and analyzed by the cloud-based system; and
   a cloud-based adjustment system responsive to the dynamic system model to generate adjustment parameters to adjust the LGSM.

2. The system of claim 1, further comprising:
   a user feedback collection system for collecting user inputs, said system including a gamification system to promote user assessments of grow results.

3. The system of claim 1, further comprising:
   a database of collected assessments from subject matter experts regarding the crop to provide expert grower guidance regarding the crop, and
   wherein the learning system is further responsive to expert grower guidance in said database.

4. A horticulture control system for local growing systems to grow plants, the horticulture control system comprising:
   a set of grow objectives for a local growing system in a local growing environment comprising one or more of crop weight per square meter, plant color, skin thickness, chemical content and plant shape;
   a set of static system parameters defining aspects of the local growing environment, including to plant breeds and varieties, geographic location (longitude and latitude), physical details of the growing system environment including area and irrigation methods and environmental equipment including one or more of heating, cooling, irrigation and lighting equipment;
   a vector of system parameters including one or more of average day temperature, trimming patters and vapor pressure deficit (VPD);
   an electronic local expert growing system (LEGS), including:
      a local growing system model (LGSM) of the local growing system;
      a grow recommendation engine (GRE) responsive to the LGSM, user real time inputs and externally supplied real-time recommendations to provide selectively adjustments to system parameters;
      a grow parameter generator to generate the vector of system parameters in response to outputs from the GRE, the set of one or more grow objectives and said vector of static system parameters; and
      a local expert control system to utilize the vector of system parameters to produce a set of actionable instructions for the local growing system based on grow system parameters;
   a physical system including one of more of heating, cooling, irrigation and lighting equipment to perform the actionable instructions on the local growing system;
   a measurement system configured to collect result data from the physical system, including data from the plants and local environment;
   a local data collection system for generating a local crop data set including the collected result data;
   a cloud-based mathematical generalized dynamic system model of the local growing system comprising a set of coefficients;

a cloud-based learning system responsive to crop data sets from a plurality of local grow systems to assess of the local growing system against the set of grow objectives, the learning system to train and iteratively adjust the generalized dynamic system model in dependence on respective crop data sets from respective local grow systems; and a cloud-based adjustment system responsive to the adjusted generalized dynamic system model to generate adjustment parameters to the plurality of local grow systems to adjust the respective local system models;

wherein data is continuously collected, stored and analyzed by the cloud-based system.

5. The system of claim 4, wherein the cloud-based learning system is further responsive to expert advice data and local user feedback data to adjust the generalized dynamic system model.

6. The system of claim 4, further comprising:

a predictive growing system simulator responsive to real-time data comprising the crop data sets to generate revised predictive grow results;

the cloud-based learning system further responsive to the revised predictive grow results to optimize the generalized dynamic system model;

a real-time grow parameter adjustment system responsive to the optimized dynamic system model to generate real-time adjustment parameters to the local grow system for adjustments to the LGSM during a growing cycle.

7. A horticulture control system for a local growing system to grow plants in a local growing environment with predicted grow results, the horticulture control system comprising:

a set of static system parameters defining aspects of the local growing environment, including to plant breeds and varieties, geographic location (longitude and latitude), physical details of the growing system environment including area and irrigation methods and environmental equipment including one or more of heating, cooling, irrigation and lighting equipment a local data collection system for collecting data from the local growing system regarding the local growing environment and generating a crop dataset;

a local growing system model (LGSM) of the local growing system including a set of feature coefficients, the LGSM relating the set of static system features and set of grow objectives to provide a set of required actions to produce grow results that match the set of grow objectives;

a cloud-based predictive growing system simulator responsive to real-time data comprising said crop dataset to generate revised predicted grow results;

a cloud-based real-time grow parameter adjustment system responsive to the predictive growing system simulator to generate real-time recommendations for adjustments to the local growing system during a growing cycle;

a cloud-based mathematical generalized model of a horticulture growing process for the plants, comprising a set of coefficients;

a cloud-based machine learning system responsive to said crop dataset for a plurality of local growing environments to train, retrain and adjust the cloud-based generalized growing model to optimize a growing regimen to produce the desired set of grow objectives; and a cloud-based user system model adjustment system to generate adjustment parameters to the LGSM in dependence on the adjusted centralized dynamic model.

8. The system of claim 7, wherein the learning system is utilizes expert advice data and local user feedback to adjust the cloud based generalized model.

9. The system of claim 8, wherein the learning system utilizes other external datasets to adjust the cloud-based generalized model.

10. The system of claim 7, further comprising a grow recommendation engine responsive to user inputs and to the real-time recommendations for generating system parameter adjustments.

11. The system of claim 7, further comprising:

an electronic user input system to collect local user input data;

a gamification system configured with the electronic user input system to increase a quantity and a quality of the data collected by the local data collection system.

12. The system of claim 7, further comprising:

a grow journal system to electronically collect freeform notes from local users about the local growing environment;

wherein the data collection system is to parse and label the freeform notes; and wherein the learning system is to use the freeform notes to adjust the generalized growing model.

\* \* \* \* \*